(12) United States Patent
Pourcheresse

(10) Patent No.: US 12,319,126 B2
(45) Date of Patent: Jun. 3, 2025

(54) REFRIGERATION SYSTEMS WEIGHT ANALYSIS

(71) Applicant: Carrier Corporation, Palm Beach Gardens, FL (US)

(72) Inventor: Lionel Pourcheresse, Franqueville Saint Pierre (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 138 days.

(21) Appl. No.: 17/715,423

(22) Filed: Apr. 7, 2022

(65) Prior Publication Data
US 2022/0324297 A1 Oct. 13, 2022

(30) Foreign Application Priority Data
Apr. 8, 2021 (EP) .................................... 21167426

(51) Int. Cl.
*B60H 1/32* (2006.01)
*G01G 19/02* (2006.01)

(52) U.S. Cl.
CPC ......... *B60H 1/3205* (2013.01); *B60H 1/3232* (2013.01); *G01G 19/021* (2013.01); *B60H 2001/3272* (2013.01)

(58) Field of Classification Search
CPC .... B60H 2001/3272; B60H 2001/3236; B60H 1/32; B60H 1/3232; B60H 1/3205;
(Continued)

(56) References Cited

U.S. PATENT DOCUMENTS

| 5,929,347 A * | 7/1999 | Matsuura | G01N 1/04 73/864.31 |
| 2013/0081883 A1* | 4/2013 | Yang | G01G 19/10 177/1 |

(Continued)

FOREIGN PATENT DOCUMENTS

| CN | 105758109 A * | 7/2016 | ........... F25D 29/003 |
| CN | 108216963 A | 6/2018 | |

(Continued)

OTHER PUBLICATIONS

European Search Report for Application No. 21167426.2; Issued Oct. 11, 2021; 8 Pages.

*Primary Examiner* — Nelson J Nieves
*Assistant Examiner* — Meraj A Shaikh
(74) *Attorney, Agent, or Firm* — CANTOR COLBURN LLP

(57) ABSTRACT

A refrigeration system 1a includes a refrigerated compartment 2 for storing perishable goods; a refrigeration unit 10 operably coupled to the refrigerated compartment 2; a plurality of sensors including an internal temperature sensor 4 configured to determine a temperature of the refrigerated compartment 2, and a weight sensor 5a configured to determine a weight of the goods located within the refrigerated compartment 2; and a controller 20 configured to: receive data from the plurality of sensors; determine a thermal inertia parameter of the goods located within the refrigerated compartment 2 based upon the temperature of the refrigerated compartment 2 and the weight of the goods; and adjust a mode of operation of the refrigeration unit 10 in accordance with the thermal inertia parameter of the goods.

6 Claims, 1 Drawing Sheet

(58) Field of Classification Search
CPC ............ B60H 1/00742; B60H 1/00014; B60H 1/00264; B60G 2400/61; B60G 2300/0262; F25D 2500/04; F25D 2700/02; F25D 2700/12; F25D 2700/16
See application file for complete search history.

(56) References Cited

U.S. PATENT DOCUMENTS

| | | |
|---|---|---|
| 2015/0345847 A1 | 12/2015 | Rusignuolo et al. |
| 2018/0001746 A1* | 1/2018 | Vehr .................... B60H 1/3226 |
| 2019/0299749 A1* | 10/2019 | Lattin ..................... F25B 27/00 |
| 2020/0180399 A1* | 6/2020 | Tone ........................ B60L 1/00 |
| 2021/0199371 A1* | 7/2021 | Han ....................... G16Y 40/35 |
| 2021/0300437 A1* | 9/2021 | Kawada .................. G07F 17/12 |
| 2022/0214094 A1* | 7/2022 | Fernandez Blanco .. F25B 13/00 |
| 2022/0299261 A1* | 9/2022 | Salter ................. B60H 1/00264 |

FOREIGN PATENT DOCUMENTS

| | | | |
|---|---|---|---|
| CN | 108317806 A | * | 7/2018 |
| KR | 20160048544 A | | 5/2016 |
| WO | WO-2022211793 A1 | * | 10/2022 |

* cited by examiner

REFRIGERATION SYSTEMS WEIGHT ANALYSIS

FOREIGN PRIORITY

This application claims priority to European Patent Application No. 21167426.2, filed Apr. 8, 2021, and all the benefits accruing therefrom under 35 U.S.C. § 119, the contents of which in its entirety are herein incorporated by reference.

TECHNICAL FIELD OF INVENTION

The present disclosure relates to refrigeration systems, and more particularly to an apparatus and method for monitoring and controlling refrigeration systems.

BACKGROUND OF THE INVENTION

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed at a specific temperature or within a suitable temperature range to avoid damage, spoilage or other undesirable effects.

Commonly, a cold chain distribution system includes static refrigeration units for storage of perishable goods in fixed locations (e.g. warehouses) and transport refrigeration units (TRUs) for transport of perishable goods between storage locations.

Conventionally, refrigeration systems include a refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. The refrigerant compressor operates as a pump to pressurise, and control the circulation of, the refrigerant. Air or an air/gas mixture is drawn from the compartment containing perishable goods by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the refrigerated compartment. Alternatively, the refrigeration system may be operated in reverse to supply heated air to the refrigerated (i.e. temperature-controlled) compartment.

In commercially available refrigeration systems, the compressor, and typically other components of the refrigeration unit, is controlled based on environmental data such as return air temperature and ambient air temperature.

However, other parameters of the refrigeration system can be monitored and processed to provide improved insight into the behaviour of the refrigeration system and consequently improved control of the refrigeration system.

SUMMARY OF THE INVENTION

Viewed from a first aspect, the present invention provides a refrigeration system comprising: a refrigerated compartment for storing perishable goods; a refrigeration unit operably coupled to the refrigerated compartment; a plurality of sensors including an internal temperature sensor configured to determine a temperature of the refrigerated compartment, and a weight sensor configured to determine a weight of the goods located within the refrigerated compartment; and a controller configured to: receive data from the plurality of sensors; determine a thermal inertia parameter of the goods located within the refrigerated compartment based upon the temperature of the refrigerated compartment and the weight of the goods; and adjust a mode of operation of the refrigeration unit in accordance with the thermal inertia parameter of the goods.

The applicant has recognised that monitoring and using weight data of stored goods in a refrigeration system can enhance control of the refrigeration system, in particular by adjusting control of the refrigeration unit. The evaluation of a thermal inertia parameter of perishable goods located within the refrigerated compartment provides augmented insight into the temperature behaviour of the system and thus, by adjusting the mode of operation of the refrigeration unit in accordance with this thermal inertia parameter, temperature control can be optimised and energy efficiency can be improved.

The thermal inertia parameter is based on the measured temperature and weight and it may be any parameter that is indicative of the resistance of the perishable goods to temperature fluctuations, i.e. a parameter indicative of thermal inertia. It will of course be appreciated that it is not possible to accurately determine an absolute measure of material properties tied to thermal inertia of the goods such as volumetric or specific heat capacity without added information regarding the nature of the materials involved. However, by use of temperature and weight measurements it is possible to obtain a suitable parameter linked to the resistance of the perishable goods to temperature fluctuations. The measurement from the weight sensor gives an indication of the thermal mass of the goods. The thermal inertia parameter may increase with increasing weight and decrease with decreasing weight. The thermal inertia parameter may for example be based on a function of the measured weight and this function may be in proportion with the weight or may include a sum of values including a value that is in proportion with the weight. The thermal inertia parameter may be based on a function of the measured weight and the measured temperature as well as optionally other values, such as an external air temperature.

The refrigeration system may be a transport refrigeration system comprising a vehicle. The weight sensor may be an existing sensor of the vehicle. The weight sensor may be an axle load sensor of the vehicle.

In transport refrigeration systems, the vehicle may already have been provided with a sensor configured to monitor a load of the vehicle (e.g. to monitor/regulate the stress applied to axles of the vehicle). The existing sensor may be part of an electronic braking system (EBS) of the vehicle, or may be an independent sensor. The existing sensor may be in communication with a controller of the vehicle.

Advantageously, the controller of the transport refrigeration system may be configured to receive/collect data from the existing vehicle sensor. Accordingly, the controller of the transport refrigeration system may be in direct wired or wireless communication with the existing vehicle sensor, e.g. the controller may be configured to acquire the weight of the goods from the weight sensor via an existing CAN bus connection of the vehicle. Alternatively, the controller may obtain the sensor data from the vehicle controller.

Utilising an existing sensor of the vehicle of the transport refrigeration system removes the need to install a new dedicated weight sensor, reducing the number of parts required and reducing costs.

The plurality of sensors may further comprise a door sensor configured to determine when a door of the refrigerated compartment is open.

The plurality of sensors may further comprise an external temperature sensor configured to determine a temperature of an environment external to the refrigeration system.

The plurality of sensors may further comprise one or more sensors positioned within the refrigeration unit and configured to monitor one or more operational parameters of the refrigeration unit.

The operational parameters of the refrigeration unit may include one or more of a temperature of the refrigeration unit, a speed of the compressor, a suction pressure of the compressor, and a discharge pressure of the compressor.

The plurality of sensors may further comprise one or more cameras positioned within the refrigerated compartment and configured to monitor the refrigerated compartment. The camera(s) may be configured to monitor at least one of the one or more doors, the perishable goods within the refrigerated compartment, and an air vent of the refrigerated compartment.

The plurality of sensors may comprise a single camera configured to monitor one or more of the one or more doors, the perishable goods within the refrigerated compartment, and an air vent of the refrigerated compartment. The single camera may be configured to monitor multiple features, either by as a result of the positioning of the camera or by movement of the camera (e.g. rotation, panning) to adjust the field of view.

Alternatively, the plurality of sensors may comprise multiple cameras, each camera configured to monitor one of the one or more doors, the perishable goods within the refrigerated compartment, and an air vent of the refrigerated compartment.

The plurality of sensors may comprise an internal environment condition sensor configured to monitor an environmental condition (e.g. humidity, air pressure) of the refrigerated compartment.

The plurality of sensors may comprise an external environment condition sensor configured to monitor an environmental condition (e.g. humidity, air pressure) of an environment external to the refrigeration system (e.g. ambient).

The refrigeration system may comprise a plurality of refrigerated compartments, and each refrigerated compartment may be associated with a respective plurality of sensors.

The refrigeration system may be a transport refrigeration system comprising a vehicle and the controller of the refrigeration system may comprise a positioning system configured to determine a location/position of the transport refrigeration system. The positioning system may comprise a Global Positioning System (GPS) sensor or Global System for Mobile Communications (GSM) sensor. Alternatively, the controller may be in communication with an existing GPS sensor and/or existing GSM sensor of the vehicle/vehicle controller.

The mode of operation of the refrigeration unit may comprise: running the refrigeration unit until the internal temperature of the refrigerated compartment reaches a target temperature of the perishable goods located within the refrigerated compartment; stopping the refrigeration unit until the internal temperature of the refrigerated compartment is outside predetermined bounds of the target temperature of the perishable goods; and resuming running of the refrigeration unit.

The controller may be configured to control and/or monitor the mode of operation of the refrigeration unit.

The controller may be configured to process the sensor data by determining parameters indicative of the usage and behaviour of the refrigeration system.

The controller may be configured to associate a door opening event with a change in weight of the perishable goods and to record the door opening event and change in weight. This record may allow for unexpected weight changes (e.g. unplanned gains or losses) to be identified, improving security of the refrigerated system.

The controller may be configured to raise an alert signal responsive to determining that the door of the refrigerated compartment has been open for longer than a predetermined time period.

The controller may be configured to determine the time period based on the thermal inertia parameter of the perishable goods located in the refrigerated compartment. As such, the time period may be determined to minimise the risk that the perishable goods become spoiled or damaged as a result of the door being open.

The controller may be configured to determine if a door of the refrigerated compartment should not be opened based on the thermal inertia parameter of the perishable goods and the external environment temperature.

The controller may be configured to raise an alert signal if it is determined that a door of the refrigerated compartment should not be opened. As such, the alert signal may be raised if the controller determines, based on the thermal inertia parameter of the perishable goods and the external environment temperature, that opening the door may result in the perishable goods becoming spoiled or damaged.

The controller may be configured to predict, based on past usage of the one or more doors, when a future door opening event may occur. The controller may be configured to predict, based past usage of the one or more doors, the duration of a future door opening event. Alternatively, the controller may be configured to obtain a loading schedule for the refrigeration system from which the frequency and duration of any door opening events can be predicted (i.e. determined).

The controller may be configured to adjust the mode of operation of the refrigeration unit in anticipation of a future door opening event. The controller may be configured to adjust the mode of operation of the refrigeration in anticipation of a future door opening event based on at least one of the thermal inertia parameter, the target internal temperature, the internal temperature and the external temperature.

The controller may be configured to monitor for an unexpected change in the weight of the perishable goods located within the refrigerated compartment based on the loading schedule. The controller may be configured to monitor for an unexpected door opening event based on the loading schedule. The loading schedule may dictate how the perishable goods should be loaded into and/or unloaded from the refrigerated compartment. The loading schedule may include data relating to the weight of perishable goods that should be loaded into and/or unloaded from the refrigerated compartment. The controller may be configured to raise an alert signal if there is an unexpected door opening or change in weight. Thus security of the refrigeration unit is improved.

The controller may be configured to identify when the change in weight of the refrigerated compartment corresponds to the loading schedule, e.g. a sufficient proportion of perishable goods has been loaded/unloaded. The controller may be configured to raise an alert signal that a loading/unloading of the refrigerated compartment should cease. Thus quality control of the loading/unloading process, i.e. delivering the correct amount of perishable goods to the correct destination, is improved.

The controller may be configured to operate the camera to monitor the refrigerated compartment in response to determining that one or more doors has been opened.

The controller may be configured to operate the camera to monitor the refrigerated compartment in response to determining that a weight of the perishable goods has changed.

The controller may be configured to operate the camera to determine a volume capacity of the refrigerated compartment. The controller may be configured to raise an alert signal to indicate that the refrigerated compartment has capacity for perishable goods. This indication may avoid users having to open the one or more doors to check the capacity of the refrigerated compartment, thus saving energy by reducing thermal energy losses to the external environment.

The controller may be configured to determine a weight capacity of the transport refrigeration system. The controller may be configured to notify a remote server that the transport refrigeration system has weight capacity and/or volume capacity for more perishable goods.

The controller may be configured to operate the camera to monitor an air vent of the refrigerated compartment. The controller may be configured to operate the camera to monitor an air vent of the refrigerated compartment based on at least one of the internal temperature of the refrigerated compartment, the target internal temperature of the refrigerated compartment, the predetermined bounds of the target internal temperature, and one or more operating parameters of the refrigeration unit. The controller may be configured to raise an alert signal responsive to determining that the air vent of the refrigerated compartment is obstructed.

The controller may be configured to transmit at least some of the data determined by the sensors to a remote server.

The server may be a remote server, i.e. a server that is remote from the refrigeration system. The controller of the refrigeration systems may be in communication with the server. This communication may be through a wireless connection, as illustrated, or a wired connection. The wireless connection may be a wireless communication method such as, for example, radio, microwave, cellular, satellite, or another wireless communication method.

The data transmitted to the server may include at least some of the data determined by the plurality of sensors e.g. the weight of perishable goods in the refrigerated compartment. The refrigeration system may be a transport refrigeration system comprising a positioning system and the data transmitted to the server may include the location of the transport refrigeration system 1b.

The server may be configured to perform any one of or all of the data processing steps as described above in relation to the controller of the refrigeration system. The server may additionally be able to process the data received from a plurality of refrigeration systems.

The system of the first aspect of the invention can include any one or more or each of the optional features described above, as appropriate.

Viewed from a second aspect, the present invention provides a method of controlling a refrigeration system, the refrigeration system comprising a refrigerated compartment for storing perishable goods and a refrigeration unit operably coupled to the refrigerated compartment, the method comprising: determining, using a weight sensor, a weight of the perishable goods located within the refrigerated compartment; determining, using an internal temperature sensor, a temperature of the refrigerated compartment; determining a thermal inertia parameter of the goods located within the refrigerated compartment, based upon the temperature of the refrigerated compartment and the weight of the goods; and adjusting a mode of operation of the refrigeration unit based on the thermal inertia parameter of the goods.

The method of the second aspect of the invention provides the advantages as provided by the system of the first aspect of the invention.

The mode of operation of the refrigeration unit may comprise: running the refrigeration unit until the internal temperature of the refrigerated compartment reaches a target temperature of the perishable goods located within the refrigerated compartment; stopping the refrigeration unit until the internal temperature of the refrigerated compartment is outside predetermined bounds of the target temperature of the perishable goods; and resuming running of the refrigeration unit.

The method may comprise processing data received from the plurality of sensors of the refrigeration system by determining parameters indicative of the usage and behaviour of the refrigeration system.

The method may comprise determining, using a door sensor, when a door of the refrigerated compartment is open.

The method may comprise associating a door opening event with a change in weight of the perishable goods, and recording the door opening event and change in weight. This record may allow for unplanned/unaccounted for weight changes (e.g. gains/losses) to be identified, improving security of the refrigerated system.

The method may comprise raising an alert signal when it is determined that the door of the refrigerated compartment has been open for longer than a predetermined time period.

The method may comprise determining the time period based on the thermal inertia parameter of the perishable goods located in the refrigerated compartment. As such, the time period may be determined to minimise the risk that the perishable goods become spoiled or damaged as a result of the door being open.

The method may comprise determining, using an external temperature sensor, a temperature of an environment external to the refrigeration system.

The method may comprise determining if the door of the refrigerated compartment should not be opened based on the thermal inertia parameter of the perishable goods and the external environment temperature.

The method may comprise raising an alert signal when it is determined that the door of the refrigerated compartment should not be opened. As such, the alert signal indicates that, based on the thermal inertia parameter of the perishable goods and the external environment temperature, opening the door may result in the perishable goods becoming spoiled or damaged.

The method may comprise predicting, based on past usage of the one or more doors, when a future door opening event may occur. The controller may be configured to predict, based on past usage of the one or more doors, the duration of a future door opening event. Alternatively, the method may comprise obtaining a loading schedule for the refrigeration system from which the frequency and duration of future door opening events can be determined.

The method may comprise adjusting the mode of operation of the refrigeration unit in anticipation of a future door opening event. Adjusting the mode of operation of the refrigeration in anticipation of a future door opening event may be based on at least one of the thermal inertia parameter, the target internal temperature, the internal temperature and the external temperature.

The method may comprise monitoring for an unexpected change in the weight of the perishable goods located within the refrigerated compartment based on the loading schedule. The method may comprise monitoring for an unexpected door opening event based on the loading schedule. The loading schedule may dictate how and when perishable goods should be loaded into and/or unloaded from the refrigerated compartment. The loading schedule may include data relating to the weight of perishable goods that should be loaded into and/or unloaded from the refrigerated compartment. The method may comprise raising an alert signal when it is determined there has been an unexpected door opening or change in weight. Thus security of the refrigeration unit is improved.

The method may comprise checking that a change in weight of the refrigerated compartment corresponds to the loading schedule, e.g. the correct proportion of perishable goods has been loaded/unloaded. The method may comprise raising an alert signal that a loading/unloading of the refrigerated compartment should cease. Thus, quality control of the loading/unloading process, i.e. delivering the correct amount of perishable goods to the correct destination, is improved.

The method may comprise operating the camera to monitor the refrigerated compartment in response to determining that one or more doors has been opened.

The method may comprise operating the camera to monitor the refrigerated compartment in response to determining that a weight of the perishable goods has changed.

The method may comprise operating the camera to determine a volume capacity of the refrigerated compartment. The controller may be configured to raise an alert signal to indicate that the refrigerated compartment has capacity for perishable goods. This indication may avoid users having to open the one or more doors to check the capacity of the refrigerated compartment, thus saving energy by reducing thermal energy losses to the external environment.

The method may comprise determining a weight capacity of the transport refrigeration system. The method made comprise notifying a remote server that the transport refrigeration system has weight capacity and/or volume capacity for perishable goods.

The method may comprise operating the camera to monitor an air vent of the refrigerated compartment. The method may comprise operating the camera to monitor an air vent of the refrigerated compartment based on at least one of the internal temperature of the refrigerated compartment, the target internal temperature of the refrigerated compartment, the predetermined bounds of the target internal temperature, and one or more operating parameters of the refrigeration unit. The method may comprise raising an alert signal responsive to determining that the air vent of the refrigerated compartment is obstructed.

The method may comprise transmitting at least some of the data determined by the sensors to a server. The server may be a remote server, i.e. a server that is remote from the refrigeration system. The controller of the refrigeration systems may be in communication with the server. This communication may be through a wireless connection, as illustrated, or a wired connection. The wireless connection may be a wireless communication method such as, for example, radio, microwave, cellular, satellite, or another wireless communication method.

The data transmitted to the server may include at least some of the data determined by the plurality of sensors e.g. the weight of perishable goods in the refrigerated compartment. The refrigeration system may be a transport refrigeration system comprising a positioning system and the data transmitted to the server may include the location of the transport refrigeration system $1b$.

The controller of the refrigeration system may be configured to perform any one of, or all of, the data processing steps of the method as described above. The server may be configured to perform any one of, or all of, the data processing steps of the method as described above. The method may further comprise processing, using the remote server, data received from a plurality of refrigeration systems. The method may comprise transmitting processed data from the controller to the server. The method may comprise transmitting processed data from the server to the controller.

The method of the second aspect of the invention can include any one or more or each of the optional features described above, as appropriate.

Viewed from a third aspect, the present invention provides a computer-readable storage medium comprising instructions which, when executed by a controller of a refrigeration system, cause the processor to carry out a method of controlling the refrigeration system, the refrigeration system comprising a refrigerated compartment for storing perishable goods and a refrigeration unit operably coupled to the refrigerated compartment, and the method comprising: determining, using a weight sensor, a weight of the goods located within the refrigerated compartment; determining, using an internal temperature sensor, a temperature of the refrigerated compartment; determining a thermal inertia parameter of the goods located within the refrigerated compartment, based upon the temperature of the cargo and the weight of the perishable goods; and adjusting a mode of operation of the refrigeration unit in accordance with the thermal inertia parameter of the goods.

The method of the third aspect of the invention provides the advantages as provided by the method of the second aspect of the invention.

The method of the third aspect of the invention can include any one or more or each of the optional features described in relation to the second aspect, as appropriate.

BRIEF DESCRIPTION OF THE DRAWINGS

A preferred embodiment of the present invention will now be described in greater detail, by way of example only and with reference to the drawings, in which.

DETAILED DESCRIPTION OF THE INVENTION

Figure 1:
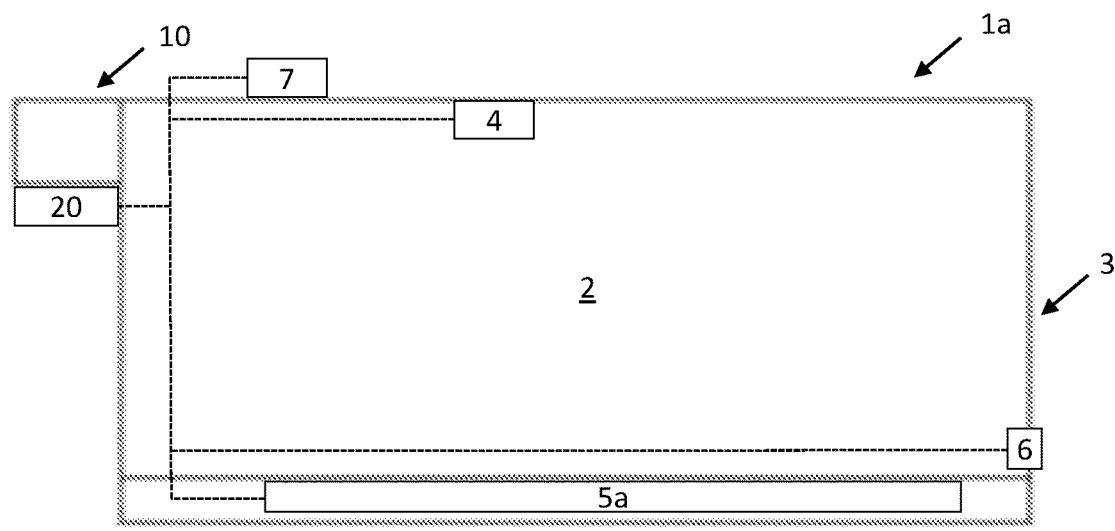
FIG. 1 shows a refrigeration system.

FIG. 1 shows a refrigeration system $1a$. The refrigeration system $1a$ comprises at least one refrigerated compartment 2 for receiving temperature-sensitive cargo (e.g. perishable goods). The refrigerated compartment 2 is operably coupled to a refrigeration unit 10 of the refrigeration system $1a$, i.e. in use, the refrigeration unit 10 is operated to maintain and/or control an internal temperature of the refrigerated compartment 2 by heating or cooling the refrigerated compartment 2. The refrigerated compartment 2 comprises one or more doors 3 for access to the refrigerated compartment 2, e.g. to move cargo in and out of the refrigerated compartment 2.

The refrigeration unit 10 includes a refrigerant compression device (not shown), a refrigerant heat rejection heat exchanger (not shown), an expansion device (not shown), and a refrigerant heat absorption heat exchanger (not shown) connected in refrigerant flow communication in a closed loop refrigerant circuit and arranged in a conventional refrigeration cycle.

The refrigerant compression device may comprise a single-stage or multiple-stage compressor such as, for example, a reciprocating compressor or a scroll compressor.

The refrigeration unit 10 may also include one or more fans (not shown) associated with the refrigerant heat rejection heat exchanger and/or the refrigerant heat absorption heat exchanger.

The refrigeration unit 10 is supplied power via a power supply system (not shown) electrically coupled to the refrigeration unit 10. The power supply system may comprise a power source, such as a battery, and/or an engine coupled to an electrical generator. The power supply system may comprise at least one power conversion component, e.g. at least one of an AC to AC voltage/frequency converter, an AC to DC rectifier, a DC to AC inverter, and a DC to DC voltage converter.

The refrigeration system 1a also includes a controller 20 configured for controlling operation of the refrigeration system 1a including, but not limited to, operation of various components of the refrigeration unit 10 to provide and maintain a desired thermal environment within the refrigerated compartment 2. Particularly, the controller 20 may be configured to operate the compression device to control the flow of refrigerant through the refrigerant circuit. The controller 20 may be configured to operate the one or more fans associated with the refrigerant heat rejection heat exchanger and/or the refrigerant heat absorption heat exchanger.

The controller 20 is configured to receive data from a plurality of sensors provided in the refrigeration system 1a. The controller 20 is in wireless or wired communication with the plurality of sensors.

The plurality of sensors includes a weight sensor 5a configured to determine a weight of the perishable goods stored in the refrigerated compartment 2. The weight sensor 5a may comprise a load cell, i.e. a transducer configured to convert a force (weight) into an electrical output. The load cell may be one of a strain gauge load cell, a pneumatic load cell, a hydraulic load cell, a capacitive load cell, a piezoelectric load cell, and a magnetoresistive load cell.

The plurality of sensors includes an internal temperature sensor 4 positioned within the refrigerated compartment 2 and configured to monitor a temperature of the refrigerated compartment 2.

The plurality of sensors may further include a door sensor 6 positioned within the refrigerated compartment 2 and configured to monitor a temperature of the refrigerated compartment 2.

The plurality of sensors may further include an external sensor 7 configured to monitor a temperature of an environment external to the refrigeration system 1a (e.g. an ambient temperature).

The plurality of sensors may further include a sensor (not shown) positioned within the refrigerated compartment 2 and configured to monitor an environmental parameter (e.g., pressure, humidity, etc.) of the refrigerated compartment 2. The plurality of sensors may further include a sensor (not shown) configured to monitor an environmental parameter (e.g., pressure, humidity, etc.) outside of the refrigeration system 1a. The plurality of sensors may further include one or more sensors (not shown) positioned within the refrigeration unit 10 and configured to monitor one or more operational parameters of the refrigeration unit 10. The operational parameter(s) of the refrigeration unit 10 may include one or more of a temperature of the refrigeration unit, a speed of the compressor, a suction pressure of the compressor, and a discharge pressure of the compressor.

The plurality of sensors may further include a camera (not shown) positioned within the refrigerated compartment 2 and configured to monitor the refrigerated compartment 2. The camera may be configured to monitor the refrigerated compartment 2 and the one or more doors 3. Accordingly, the camera provides visibility of the perishable goods within the refrigerated compartment 2, and thus can be used to determine a volume status of the refrigerated compartment 2. Alternatively or additionally, the plurality of sensors may include a camera positioned to monitor an area of the refrigerated compartment 2 where the refrigerated compartment 2 exchanges air with the refrigeration unit 10, such as an air vent. As a result, the camera may be configured to monitor if the perishable goods are obstructing the airflow in/out of the refrigerated compartment 2.

The camera(s) described above may be configured to continuously monitor the refrigerated compartment 2, or may be configured to monitor the refrigerated compartment 2 only when the one or more doors 3 are either open or closed (which may be determined by the door sensor 6). The camera may be configured to activate (e.g. start monitoring) when a status change of the refrigerated compartment 2 is registered by one or more of the plurality of sensors—for example, a change in weight of the perishable goods located in the refrigerated compartment 2, or a change in temperature of the refrigerated compartment 2.

Where the refrigeration system 1a comprises a plurality of refrigerated compartments 2, one or more or each of the plurality of refrigerated compartments 2 may include a respective plurality of sensors, as described above.

The controller 20 is configured to selectively control the operation of the refrigeration unit 10 based on the data received from the plurality of sensors. Furthermore, the controller 20 is configured to process and/or analyse the sensor data to determine further parameters related to, and representative of, the usage and behaviour of the refrigeration system 1a.

Figure 2:
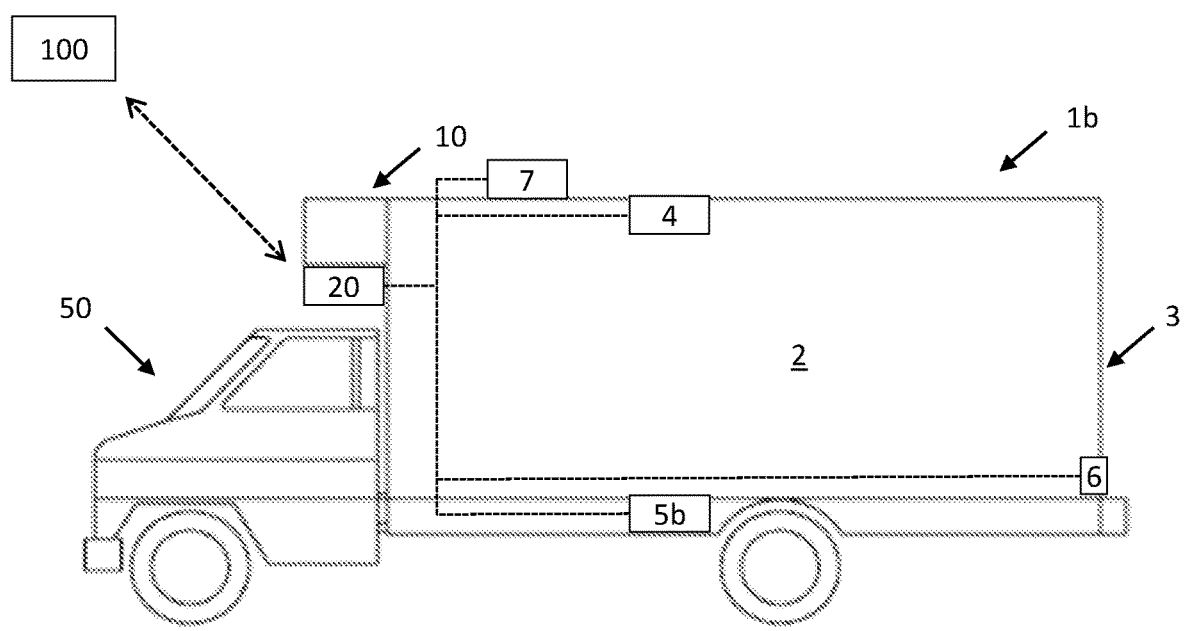
FIG. 2 shows a transport refrigeration system.

In FIG. 2, a transport refrigeration system 1b is shown. The transport refrigeration system 1b comprises a refrigeration system, for example the refrigeration system 1a of FIG. 1, in combination with a vehicle 50. As such, the features as described in relation to refrigeration system 1a above are equally applicable in transport refrigeration system 1b and substantially similar features are therefore referenced the same.

The vehicle 50 includes a vehicle engine, and may include an engine controller configured to control the operation of the vehicle engine. The engine controller may be an electronic controller including a processor and an associated memory comprising computer-executable instructions that, when executed by the processor, cause the processor to perform various operations. Alternatively or additionally, the vehicle 50 may include an electric motor configured to be powered by, for example, a battery or a fuel cell.

The vehicle 50 includes a suspension system connected to an axle of the vehicle 50. The suspension system may be, for example, a leaf spring suspension system or an air suspension system.

The suspension system may comprise an axle load sensor 5b. Where the suspension system is a leaf spring suspension system, the axle load sensor 5b may be configured to measure the distance between a frame of the vehicle 50 and the axle of the vehicle. Where the suspension system is an air suspension system, the axle load sensor 5b may be configured to measure an air pressure of the air suspension system. The axle load sensor 5b is configured to generate a signal indicative of the weight of the load carried by the vehicle 50. Accordingly, as shown in FIG. 2, where vehicle 50 comprises an axle load sensor 5b, the existing axle load sensor 5b may function as part of refrigeration system 1b in the same way as the weight sensor 5a as described above in relation to refrigeration system 1a.

The axle load sensor 5b may be an independent stand-alone sensor or may be part of an electronic braking system (EBS) of the vehicle 50.

The controller 20 of the transport refrigeration system 1b may be configured to communicate with the existing axle load sensor 5b of the vehicle 50, i.e. the controller 20 may be configured to acquire and/or receive a signal comprising data from the axle load sensor 5b. This communication may be through a wired connection, e.g. the controller 20 may be configured to determine the weight of the perishable goods stored in the refrigerated compartment 2 using data from the axle load sensor 5b via an existing CAN bus connection of the vehicle 50. Alternatively, the communication between the controller 20 and the axle load sensor may be through a wireless communication method such as, for example, radio, microwave, cellular, satellite, or another wireless communication method. Where the axle load sensor 5b is part of an electronic braking system (EBS) of the vehicle, the controller 20 may be configured to be in data communication with the EBS.

The controller 20 may comprise a positioning system configured to determine a location/position of the transport refrigeration system 1b. The positioning system may comprise a Global Positioning System (GPS) or Global System for Mobile Communications (GSM). Alternatively, the controller 20 may be in communication with an existing GPS and/or existing GSM of the vehicle 50.

The controller 20 of the transport refrigeration system 1b may be a telematics controller 20. The controller 20 of the transport refrigeration system 1b may be in wireless communication with a remote server 100 via a wireless communication network such as a telematics network. The telematics network may utilise one or more of radio, microwave, cellular, satellite, or other wireless communication methods.

The remote server 100 may be situated in a loading bay of a warehouse to coordinate the loading/unloading of the transport refrigeration system 1b. The remote server 100 may be configured to only establish communication with the controller 20 of transport refrigeration system 1b when it is on-site, i.e. within a certain range of the remote server 100, or the remote server 100 may be configured to be in continuous communication with the controller 20.

The remote server 100 may comprise a database. The database may comprise information such as at least one of a past, present, and future loading schedule of the transport refrigeration system 1b.

The controller 20 of the transport refrigeration system 1b may be configured to transmit at least some of the information of the plurality of sensors to the remote server 100. For example, the data transmitted to the server 100 may include the location of the transport refrigeration system 1b and/or at least some of the data determined by the plurality of sensors e.g. the weight of perishable goods in the refrigerated compartment 2. The processing of the sensor data may be executed by both the controller 20 and the remote server 100.

The controller 20 may be configured to receive information from the remote server 100. The information may include control instructions. The information may include at least one of a past, present, and future loading schedule of the transport refrigeration system 1b. The information may include data transmitted to the server 100 from other transport refrigeration systems 1b, e.g. the location of other transport refrigeration systems 1b and/or at least some of the operational data of other transport refrigeration systems 1b determined by a respective plurality of sensors of each transport refrigeration system 1b.

Methods of controlling the refrigeration system 1a, 1b are now described.

The refrigeration unit 10 of refrigeration system 1a, 1b is configured to operate in accordance with a certain mode of operation. The controller 20 is configured to control and/or adjust the mode of operation of the refrigeration unit 10 depending on the temperature control requirements of the refrigerated compartment 2.

For example, the perishable goods stored in the refrigerated compartment 2 may have a target internal temperature (e.g. a "set-point") associated with the type of perishable goods. As such, in an embodiment, a mode of operation of the refrigeration unit 10 may comprise running the refrigeration unit 10 (i.e. cooling or heating the refrigerated compartment 2) until the internal temperature of the refrigerated compartment 2 reaches the target internal temperature. Once the internal temperature has reached the target internal temperature, the refrigeration unit 10 is stopped (e.g. switched off). The internal temperature of the refrigerated compartment 2 is then allowed to drift away from the target internal temperature until it reaches a safe limit away from the target internal temperature (e.g. until the internal temperature is outside a set of safe, predetermined bounds). Once the internal temperature of the refrigerated compartment 2 is identified to be outside the predetermined bounds, running of the refrigeration unit 10 is resumed. Accordingly, the internal temperature is controlled in a cyclical manner.

As discussed briefly above, the refrigeration systems 1a, 1b each comprise a plurality of sensors including a weight sensor 5a, 5b and an internal temperature sensor 4. Correspondingly, the method of controlling the refrigeration systems 1a, 1b includes determining a weight of the perishable goods located within the refrigerated compartment 2, and determining a temperature of the refrigerated compartment 2.

The controller 20 is configured to execute and/or implement the method of controlling the refrigeration system 1a, 1b. As such, the controller 20 is configured to receive/collect and process data from the plurality of sensors. Processing the sensor data may include determining, from data from one or more of the sensors, if a mode of operation of the refrigeration unit 10 should be adjusted and/or if an alert signal should be raised. Processing the sensor data may include determining further parameters from data from one or more sensors, the parameters representative of a characteristic of the refrigeration system 1a, 1b.

For example, the controller 20 is configured to determine a thermal inertia parameter of the perishable goods located within the refrigerated compartment 2. The thermal inertia parameter is based on the internal temperature and the weight of the goods. The thermal inertia parameter is a parameter that provides an indication of the resistance of the goods to temperature fluctuations and, for example, the thermal inertia parameter may increase with an increased weight of goods and decrease with a decreased weight of goods. If the weight of the perishable goods in the refrigerated compartment 2 is low, and hence thermal inertia is low, the goods will be more susceptible to a change in temperature (as a result of the low thermal mass) in the event that, for example, the refrigeration unit 10 stops working as a result of a fault, or if the refrigerated compartment 2 is exposed to an ambient (external) temperature as a result of the one or more doors 3 being left open (accidentally or otherwise). If the thermal inertia parameter of the goods in the refrigerated compartment 2 is high, as indicated by a high weight measured by the weight sensor, the goods will be less susceptible to a change in the internal temperature (as a result of the large thermal mass of the goods). The thermal inertia parameter provides further insight into the temperature behaviour of the system of the perishable goods and the refrigerated compartment 2. This insight can be utilised to inform the control of the refrigeration unit 10 and/or inform a user of the status of perishable goods stored within the refrigeration systems 1a, 1b.

Thus, the controller 20 is configured to adjust a mode of operation of the refrigeration unit 10 in accordance with the thermal inertia parameter of the goods. For example, with reference to the mode of operation of the refrigeration unit 10 as described above, the thermal inertia parameter may be used to adjust the predetermined bounds of the target internal temperature.

Where the thermal inertia parameter of the perishable goods in the refrigerated compartment 2 is high (e.g. large weight of perishable goods), the goods are less susceptible to changes in temperature and the system 1a, 1b can allow for a larger deviation from the target internal temperature. Accordingly, the predetermined bounds of the target internal temperature may be increased, and, advantageously, the refrigeration unit 10 may be stopped for longer periods of time, improving energy efficiency of the refrigeration system 1a, 1b. Where the thermal inertia parameter of the perishable goods in the refrigerated compartment 2 is low (e.g. small weight of perishable goods), the goods are more susceptible to changes in temperature and the system 1a, 1b can necessarily further restrict the allowed deviation from the target internal temperature. Accordingly, the predetermined bounds of the target internal temperature may be decreased, and, advantageously, the risk of damage and/or spoilage of the perishable goods may be mitigated.

The processing of the sensor data may comprise combining the weight of the perishable goods and/or the thermal inertia parameter with other data received/collected by the controller 20 from the plurality of sensors.

For example, door sensor 6 can be used to determine a status (e.g. open or closed) of the one or more doors 3 of the refrigerated compartment 2. The controller 20 may be configured to associate a door opening event with a change in weight of the perishable goods and to record the door opening event and change in weight of the goods. This record may allow for unplanned/unaccounted for weight changes (e.g. gains/losses) to be identified, improving security of the refrigerated system 1a, 1b. In the case of transport refrigeration system 1b, the location of the transport refrigeration system 1b may also be included in the record to further improve the identification of scheduled and unscheduled changes in the weight of perishable goods in the refrigerated compartment 1b.

The status of the one or more doors 3, as determined by the door sensor 6, can also be utilised in combination with the thermal inertia parameter by the controller 20 for improved control of the refrigerated system 1a, 1b. For example, during a loading/unloading of perishable goods into/out of the refrigerated compartments 2, a user (e.g. a worker) may leave the door open for ease of access. However, this could cause a deviation in the internal temperature of the refrigerated compartment 2 from the target internal temperature that may result in damage and/or spoilage of the perishable goods in the refrigerated compartment 2.

Thus, the controller 20 may calculate a (safe) time period that the door(s) 3 can be open based on the thermal inertia parameter of the perishable goods. When it is determined that the one or more doors 3 has been left open for longer than the predetermined time period, the controller 20 can raise an alert signal for the user. Additionally, the determination of the time period may be based on an ambient (external) temperature (as monitored by the external temperature sensor 7).

The condition of the external environment (for example temperature, humidity etc.) may be such that the controller 20 determines that it would not be safe to open the one or more doors 3 (i.e. damage or spoilage of the perishable goods is highly likely as a result of exposure to the ambient environment). Thus, the controller 20 may raise an alert signal when the one or more doors 3 should not be opened.

Furthermore, the controller 20 may be configured to learn from past usage of the one or more doors 3 (i.e. past data received from the door sensor 6) when a door 3 opening event may occur, and how long the door 3 may be open for. Alternatively, the controller 20 may be provided with a loading schedule for the refrigeration system 1a, 1b from which a door opening event may be determined. The loading schedule may be stored in the controller 20, or stored in a remote server 100 and accessed by the controller 20.

In anticipation of the door opening event, and which may be based on the external air temperature, the controller 20 can adjust the mode of operation of the refrigeration unit 10. For example, the refrigeration unit 10 may be run continuously to increase/decrease the internal temperature of the refrigerated compartment 2 prior to the opening event so as to not allow the internal temperature to deviate outside the predetermined bounds of the target temperature of the perishable goods (which, as discussed above, may be based at least in part on the thermal inertia parameter of the perishable goods).

In refrigeration systems 1a, 1b comprising a plurality of sensors including a (video) camera inside the refrigerated compartment 2, the camera may be configured to monitor at least one of the refrigerated compartment 2, the perishable goods, the one or more doors 3, and an air vent (through which conditioned air from the refrigeration unit 10 is received) of the refrigerated compartment 2. Each feature of interest may be monitored by a single respective camera. Alternatively a single camera may be configured to monitor multiple features, either by as a result of the positioning of the camera or by movement of the camera (e.g. rotation, panning) to adjust the field of view.

The data collected by the camera(s) may be utilised by the controller 20 in the control of the refrigeration systems 1a, 1b in different ways, alone or by processing the camera data in combination with the data from other sensors of the plurality of sensors.

As one example, the controller 20 may receive indication from the internal temperature sensor 4 that the internal temperature of the refrigerated compartment 2 is outside predetermined safe bounds for the perishable goods. The controller 20, determines from the camera(s) that the perishable goods in the refrigerated compartment 2 are blocking the air vent of the refrigerated compartment 2. Accordingly, the controller 20 may raise an alert signal indicative of the problem for a user of the refrigerated system 1a, 1b.

In the above example, the controller 20 may also process/analyse information from one or more other sensors of the plurality of sensors in response to an unexpected temperature deviation from the target internal temperature. For example, the controller 20 may check that the one or more doors 3 are closed (via the door sensor 6) and/or that the refrigeration unit 10 is running correctly (via the operational sensor).

In another example, the operation of the camera(s) may be combined with the operation of the weight sensor 5a, 5b. The controller 20 may receive indication that there has been a change in weight of the perishable goods located in the refrigerated compartment 2. Accordingly, the camera(s) are activated so that the act of loading/unloading the perishable goods is recorded. This information may be advantageous for security control of the refrigerated systems 1a, 1b as well as for customer quality control (i.e. confirming that the correct amount of perishable goods had been unloaded/delivered or loaded/picked up).

The controller 20 may be configured to determine, via the weight sensor 5a, 5b, that the refrigeration compartment 2 is able to receive a greater load of perishable goods (based on a load maximum of the vehicle). To further improve the accuracy of this determination, the controller 20 may also be configured to process the information received from the camera(s), which may identify if there is sufficient space in the refrigerated compartment 2 for more perishable goods. Thus, the controller 20 may be configured to verify a weight capacity of the refrigerated compartment 2 as well as a volume capacity of the refrigerated compartment 2, providing improved control over the refrigeration system 1a, 1b.

Furthermore, in the transport refrigeration system 1b, this analysis may be informed in part by the positioning system of the controller 20, wherein the location of the transport refrigeration system 1b may be used to determine the vehicle load maximum of the local region. If it is determined that the transport refrigeration system 1b, is able to carry more perishable goods, the positioning system may be used to identify the nearest warehouse/refrigeration system 1a where goods can be picked up for delivery.

The location of the transport refrigeration system 1b may be processed/combined along with other sensor data in the control methods as described above. For example, it may be beneficial for security of the transport refrigeration system 1b (and quality control of the cold chain distribution system) to know a location of the transport refrigeration system 1b at the time of a door opening event and/or a weight change event.

The controller 20 of the transport refrigeration system 1b may be configured to exchange (transmit and/or receive) data with the remote server 100 via, for example, a telematics network. The data transmitted to the server 100 may include the location of the transport refrigeration system 1b and/or at least some of the data determined by the plurality of sensors e.g. the weight of perishable goods in the refrigerated compartment 2.

Thus the server 100 can track the location and status of a plurality of transport refrigeration systems 1b, and coordinate the control of the plurality of transport refrigeration systems 1b efficiently and effectively.

The server 100 may be configured to process the transmitted sensor data. For instance, the controller 20 may not perform any processing of the sensor data, and instead transmit the unprocessed sensor data to the server 100 for processing. The server 100 may process the data (for example, determine a thermal inertia parameter of the perishable goods located within the refrigerated compartment 2 of the transport refrigeration unit 1b) and transmit the processed data back to the controller 20. The server 100 may be configured to process the data of a plurality of transport refrigeration systems 1b.

What is claimed is:

1. A refrigeration system comprising:
    a refrigerated compartment for storing perishable goods;
    a refrigeration unit operably coupled to the refrigerated compartment;
    a plurality of sensors including an internal temperature sensor configured to determine a temperature in the refrigerated compartment, and a weight sensor configured to determine a weight of the goods located within the refrigerated compartment; and
    a controller configured to:
        receive data from the plurality of sensors;
        determine a weight and a temperature of the perishable goods located within the refrigerated compartment based on the data from the plurality of sensors;
        run the refrigeration unit until the internal temperature of the refrigerated compartment reaches a target temperature of the perishable goods;
        adjust predetermined bounds of the target temperature based on the weight and temperature of the perishable goods located within the refrigerated compartment;
        stop running the refrigeration unit until the internal temperature of the refrigerated compartment is outside the predetermined bounds of the target temperature of the perishable goods; and
        resume running of the refrigeration unit;
    wherein the plurality of sensors further comprises a camera positioned within the refrigerated compartment and configured to monitor the refrigerated compartment; and wherein the controller is configured to:
        determine that the internal temperature of the refrigerated compartment is outside predetermined bounds of the target temperature of the perishable goods within the refrigerated compartment, operate the camera to monitor an air vent of the refrigerated compartment, and raise an alert signal responsive to determining that the air vent of the refrigerated compartment is obstructed.

2. A refrigeration system as claimed in claim 1, wherein the plurality of sensors further comprises a door sensor configured to determine when a door of the refrigerated compartment is open; and wherein the controller is configured to raise an alert signal when it is determined that the door of the refrigerated compartment has been open for longer than a predetermined time period based on the weight and temperature of the perishable goods, wherein the predetermined time period is relatively longer for goods with a relatively higher weight and relatively shorter for goods with a relatively lower weight.

3. A refrigeration system as claimed in claim 1, wherein the plurality of sensors further comprises an external temperature sensor configured to determine a temperature of an environment external to the refrigeration system; and wherein the controller is configured to:
    calculate the likelihood of damage or spoilage of the perishable goods as a result of exposure to the external environment based on the weight and temperature of the goods and the external environment temperature, and raise an alert signal responsive to determining that a door of the refrigerated compartment should not be opened based on the likelihood of damage or spoilage of the perishable goods.

4. A refrigeration system as claimed in claim 1, wherein the plurality of sensors further comprises a camera positioned within the refrigerated compartment and configured to monitor the refrigerated compartment; and wherein the controller is configured to:

identify an unused weight capacity of the refrigeration system based on the weight of the perishable goods located within the refrigerated compartment, operate the camera to identify an unused volume capacity of the refrigerated compartment, and raise an alert signal to indicate when the refrigeration system has unused weight and volume capacity.

5. A refrigeration system as claimed in claim 1, wherein the controller is configured to:

obtain a loading schedule indicative of past and future loading events;

determine that a change has occurred in the weight of the perishable goods located within the refrigerated compartment; and raise an alert signal responsive to determining that the change in the weight of the perishable goods does not correspond to the loading schedule.

6. A refrigeration system as claimed in claim 1, wherein the controller is configured to:

predict a future door opening event during which a door of the refrigerated compartment will be open; and adjust the operation of the refrigeration unit prior to the future door opening event in accordance with a predicted duration of the future door opening event and the weight and temperature of the perishable goods.

* * * * *